(12) United States Patent
Shen

(10) Patent No.: US 8,128,266 B2
(45) Date of Patent: Mar. 6, 2012

(54) EDGE-LIGHT BACKLIGHT ASSEMBLY

(75) Inventor: Chang-Han Shen, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 324 days.

(21) Appl. No.: 12/633,626

(22) Filed: Dec. 8, 2009

(65) Prior Publication Data

US 2011/0134658 A1  Jun. 9, 2011

(51) Int. Cl.
*F21V 7/04* (2006.01)
(52) U.S. Cl. ......... 362/524; 362/625; 362/613; 362/621
(58) Field of Classification Search .......... 362/608–609, 362/612, 613, 616, 621–625, 627–628, 293
See application file for complete search history.

(56) References Cited

U.S. PATENT DOCUMENTS

| 7,717,605 B2 * | 5/2010 | Shibata | 362/630 |
| 7,810,977 B2 * | 10/2010 | Ueyama | 362/610 |
| 2010/0149834 A1 * | 6/2010 | Kim et al. | 362/612 |

FOREIGN PATENT DOCUMENTS

TW  300626  3/1997

\* cited by examiner

*Primary Examiner* — Thomas Sember

(57) ABSTRACT

An edge-light backlight assembly is provided, which includes a light guide and a protruding part. The protruding part is provided for receiving light from various directions. The light received by the protruding part directly enters or is reflected to enter the light guide, and then the light leaves the light guide to provide backlight. Light sources are arranged to project light to the protruding part in different directions, such that the light sources can be disposed dispersedly to reduce the thickness of the light guide and heat generated is distributed over a large area.

17 Claims, 7 Drawing Sheets

EDGE-LIGHT BACKLIGHT ASSEMBLY

BACKGROUND OF THE INVENTION

1. Technical Field

The present invention relates to a backlight module, in particular to an edge-light backlight assembly using a plurality of light sources.

2. Related Art

A backlight module provides light to pass through a liquid crystal panel, such that users can see images on the liquid crystal panel. The brightness of the backlight module influences the viewing quality of the users, and if the brightness is too low, the users cannot easily see the images on the liquid crystal panel, especially when the background brightness is relatively high.

In a direct-light-type backlight module, since the cold cathode fluorescent lamps (CCFLs) which serve as light sources are disposed above a backlight plate, the brightness can be easily enhanced by increasing the number of the CCFLs. Moreover, there is large space in the direct-light-type backlight module to perform heat dissipation by air cooling, thus avoiding the influence of high temperature.

In an edge-light backlight assembly, generally only one CCFL is utilized. The light projected by the CCFL enters the light guide from a very narrow lateral surface of the light guide. Generally, the width of the lateral surface of the light guide is slightly greater than the diameter of the CCFL, so it is difficult to enhance the brightness of the backlight module by directly adding more CCFLs. If it intends to increase the number of the CCFLs, the thickness of the light guide has to be increased to increase the width of the lateral side of light guide. Since the CCFLs are arranged in parallel corresponding to the longitudinal direction of the lateral surface, and a larger width of the lateral side of light guide allows more CCFLs to be disposed corresponding to the lateral surface of the light guide in parallel, for example, "Reflector for Light Source of Backlight Module" in R.O.C (Taiwan) Utility Model No. 300626. However, the edge-light backlight assembly aims to have a low thickness, so the method of increasing the thickness of the light guide does not meet the development trend of the edge-light backlight assembly.

FIG. 1 is another backlight module 1 having more than one CCFL. Referring to FIG. 1, in the backlight module 1, two CCFLs 2 are respectively disposed corresponding to two opposite lateral surfaces 3*a* of the light guide 3, and thus it is not required to increase the thickness of the light guide 3. However, the following problems occur due to additionally adding the CCFLs 2.

Firstly, two lateral surfaces 3*a* corresponding to the two CCFLs 2 are generally corresponding to the top edge and bottom edge of the liquid crystal display (LCD). Therefore, frame widths at the bottom edge and the top edge of the LCD have to be increased simultaneously to accommodate the CCFLs 2. The increased edge occupies additional area at the front side of the LCD, thus reducing the viewing area of the LCD.

Secondly, the two CCFLs 2 of the same specification are disposed at two opposite lateral surfaces 3*a* of the light guide 3. That is the two lateral surfaces 3*a* are required to have the same length and width, and thus a backlight surface 3*c* and a light exiting surface 3*d* of the light guide 3 are parallel to each other. As a result, a ratio of the light directly leaving the light exiting surface 3*d* at a small included angle (with respect to a normal line of the light exiting surface 3*d*) in the light reflected by the backlight surface 3*c* for the first time is decreased. The light leaving the light exiting surface 3*d* at a large included angle may leave the light exiting surface 3*d* after several times of reflection between the light exiting surface 3*d* and the backlight surface 3*c*, or the light may directly leave the light exiting surface 3*d* at a large included angle with respect to the normal line. Therefore brightness in front of the light exiting surface 3*d* of the light guide 3 is reduced, and adverse effect the efficiency of the CCFLs 2.

Thirdly, the two CCFLs 2 are located at the top edge and the bottom edge of the LCD. In a laptop computer, a shaft is disposed on the bottom edge of the LCD to pivot the LCD to a body of the laptop computer. Cabled and wires for electrically connecting the liquid crystal panel and the CCFL 2 to the electronic circuits in the body pass through the shaft. In a backlight module of a single cold cathode tube 2, the CCFL 2 is located at the top edge of the LCD. In the backlight module having two CCFLs 2, the second CCFL 2 is located at the bottom edge of the LCD. The cables and wires for electrically connecting the liquid crystal panel and the CCFL 2 must bypass the second CCFL 2 firstly and then run through the shaft. The second CCFL 2 results in difficulty in arranging the cables and wires.

Finally, due to thermal convection inside the LCD caused by the two CCFLs 2 at the top edge and the bottom edge, the CCFL 2 at a higher position has a higher temperature. As the two CCFLs 2 have different temperatures, the problem that the luminance of the two CCFLs 2 is not uniform occurs.

To solve the problem of low luminance efficiency of the CCFLs 2, light emitting diodes (LEDs) having higher luminance efficiency are used to replace the CCFLs. The LEDs are arranged on a narrow circuit board in an array, and the higher the arrangement density is, the higher the luminance is. However, the arrangement density of the LED array is still limited, otherwise the generated heat will make the temperature of the LEDs raised rapidly, which impacts the luminance and color rendering of the LEDs. If multiple rows of LED array are adopted to disperse the density the LEDs, the thickness of the light guide is also required to be increased, which does not meets the requirement of edge-light backlight assembly. At the same time, the LEDs are still concentrated at a single side 3*a* of the light guide 3, and the problem of heat concentration still exists. If the LEDs are disposed at two opposite lateral surfaces 3*a* of the light guide 2, as shown in FIG. 1, the aforementioned problems still occur.

SUMMARY

In edge-light backlight assemblies in the prior art, with the increase of the light sources disposed, problems of thickness increase of the light guide, visual area ratio decrease of liquid crystal display (LCD) module, and heat concentration occur. In view of the above problems, the present invention is directed to an edge-light backlight assembly to solve the problems.

The present invention provides an edge-light backlight assembly, which includes a light guide and a protruding part. The light guide is made of a light-pervious material, and includes a primarily reflecting surface, a light exiting surface, and a light entering interface. The primarily reflecting surface is disposed opposite the light exiting surface, and the light entering interface is connected to the primarily reflecting surface and the light exiting surface. The protruding part is made of a light-pervious material, and is disposed on the light entering interface. The protruding part includes a first light entering surface, a second light entering surface, and a secondary reflecting surface. The first light entering surface is disposed opposite the light entering interface. The first light entering surface receives light to enter the protruding part, and the light enters the light guide through light entering surface and is projected on the primarily reflecting surface. The secondary reflecting surface is located between the light exiting surface of the light guide and the first light entering surface. The secondary reflecting surface reflects the light such that the light enters the light guide through the light entering interface and is projected on the secondary reflecting surface. The second light entering surface is located between the primarily reflecting surface of the light guide and the first light entering surface, and is disposed opposite the secondary reflecting surface The second light entering surface is provided for the light to pass through to enter the protruding part, so as to be projected on the secondary reflecting surface. The light is reflected to the primarily reflecting surface by the secondary reflecting surface. The light projected on the primarily reflecting surface is finally reflected to the light exiting surface by the primarily reflecting surface, and leaves the light guide.

The protruding part is provided for light being incident from different directions, so the light sources can be disposed at different positions separately without increasing the thickness of the light guide, and the heat generated by the light sources can be effectively dissipated.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
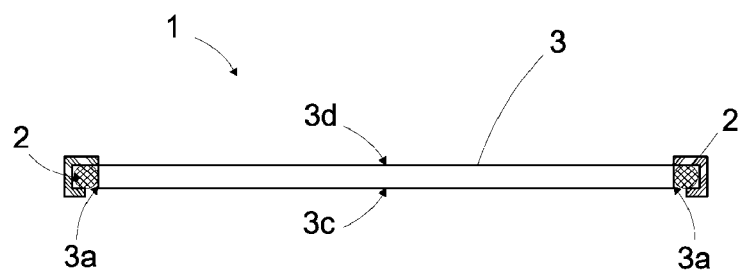
FIG. 1 is a cross-sectional view of a backlight module with two CCFLs in the prior art.
Figure 2:
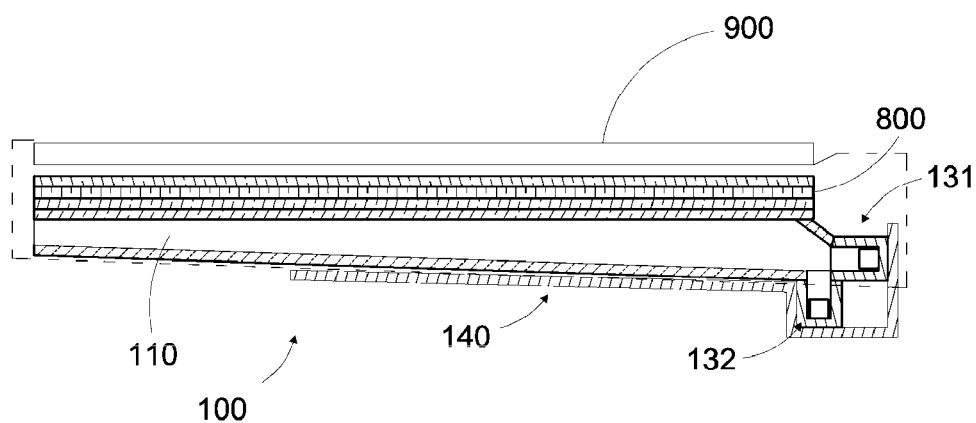
FIG. 2 is a cross-sectional view of a liquid crystal display (LCD) according to a first embodiment of the present invention.
Figure 3:
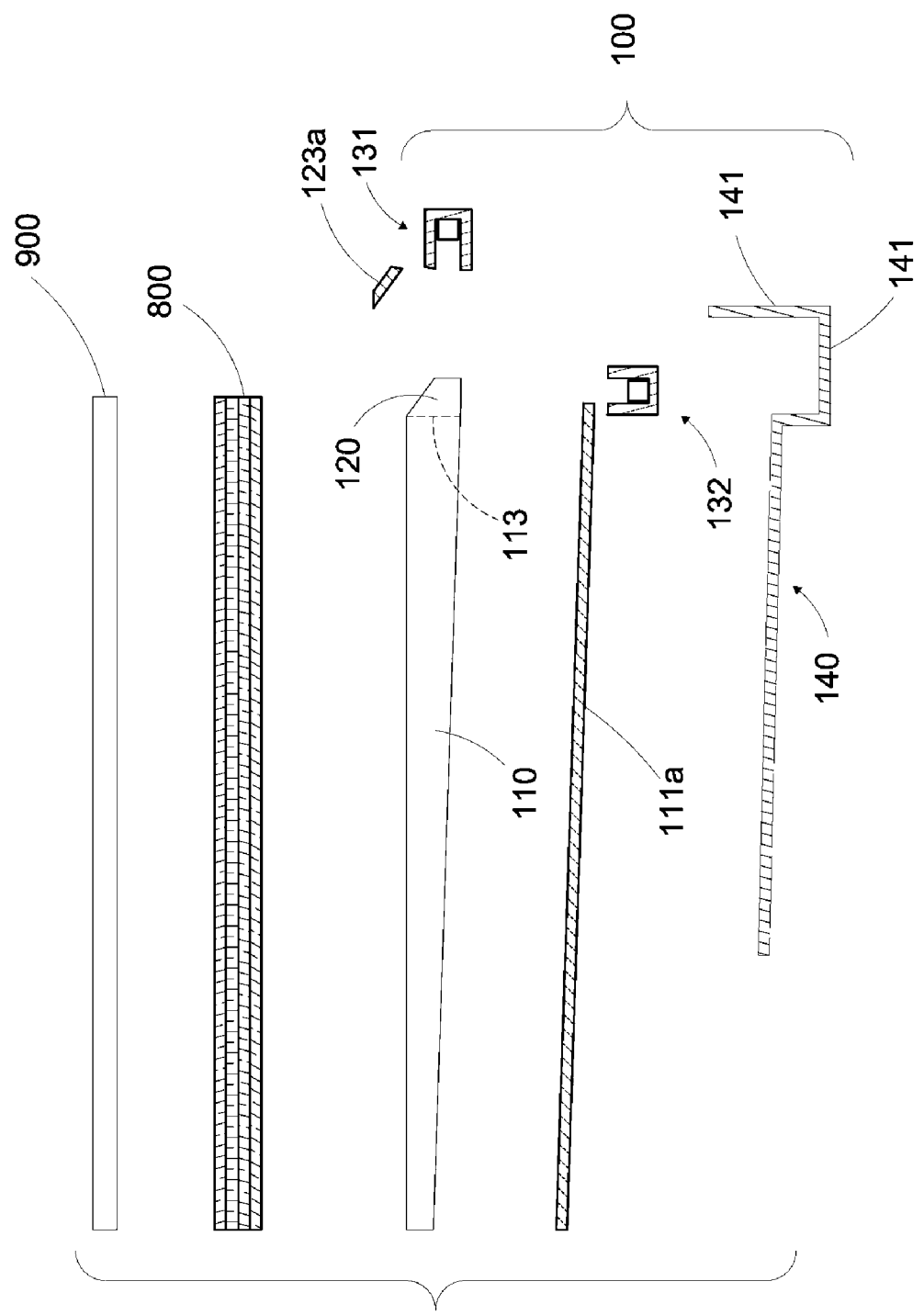
FIG. 3 is an exploded cross-sectional view of the LCD according to the first embodiment of the present invention.

Referring to FIGS. 2 and 3, an edge-light backlight assembly 100 according to a first embodiment of the present invention is shown, which is applicable in a liquid crystal displayer (LCD). The LCD includes the edge-light backlight assembly 100, a plurality of optical films 800, and a liquid crystal panel 900. The edge-light backlight assembly 100 provides backlight, while the plurality of optical films 800 is located between the edge-light backlight assembly 100 and the liquid crystal panel 900. The optical films 800 includes color filters, polarizer, brightness enhancing films etc. The optical films 800 are provided for changing the light properties and improve the brightness of the backlight in a specific direction to penetrate the liquid crystal panel 900.

Figure 4:
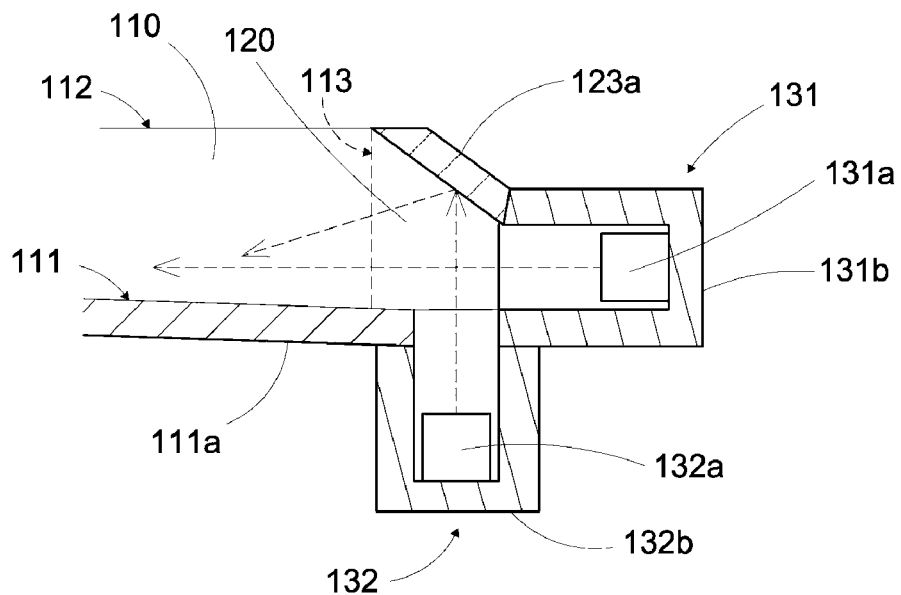
FIG. 4 is a partial cross-sectional view of an edge-light backlight assembly according to the first embodiment of the present invention.

Referring to FIGS. 2, 3, and 4, the edge-light backlight assembly 100 includes a light guide 110, a protruding part 120, a first lamp assembly 131, and a second lamp assembly 132.

Figure 5:
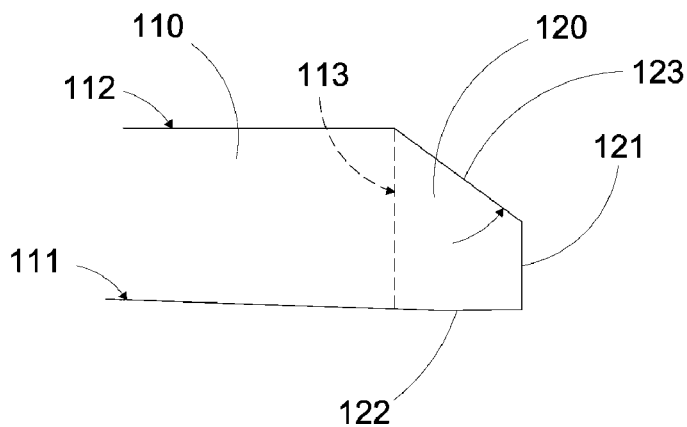
FIG. 5 is a partial cross-sectional view of a light guide according to the first embodiment of the present invention.

Referring to FIGS. 4 and 5, the light guide 110 is made of a light-pervious material, and includes a primarily reflecting surface 111, a light exiting surface 112, and a light entering interface 113. The primarily reflecting surface 111 is disposed opposite the light exiting surface 112, and the light entering interface 113 connects the primarily reflecting surface 111 and the light exiting surface 112. Brightness enhancing structures (not shown) are further formed on the light exiting surface 112. The brightness enhancing structures change the direction of the light leaving the light exiting surface 112, such that the light is converged into a normal line of the light exiting surface 112. Therefore, light intensity is enhanced. Furthermore, a small included angle is formed between the primarily reflecting surface 111 and the light exiting surface 113.

Referring to FIGS. 4 and 5, the protruding part 120 is made of a light-pervious material. The protruding part 120 is disposed on the light entering interface 113. The protruding part 120 is monolithically formed on the light entering interface 113. In another implement, the protruding part 120 is adhered to the light entering interface 113 by transparent glue. The protruding part 120 includes a first light entering surface 121, a second light entering surface 122, and a secondary reflecting surface 123.

Referring to FIGS. 4 and 5, the first light entering surface 121 is disposed opposite the light entering interface 113. The first light entering surface 121 receives light to enter the protruding part 120. The light passing through the first light entering surface 121 further enters the light guide 110 through the light entering interface 113, and travels between the primarily reflecting surface 111 and the light exiting surface 112. At least a part of the light entering the light guide 110 is projected on the primarily reflecting surface 111, and is further reflected to the light exiting surface 112 by the primarily reflecting surface 111.

The secondary reflecting surface 123 is located between the light exiting surface 112 of the light guide 110 and the first light entering surface 121. The secondary reflecting surface 123 reflects light, such that the light enters the light guide 110 through the first light entering surface 121 and is projected on the primarily reflecting surface 111.

The second light entering surface 122 is located between the primarily reflecting surface 111 of the light guide 110 and the first light entering surface 121, and is disposed opposite the secondary reflecting surface 123. The second light entering surface 122 is provided for the light to pass through to enter the protruding part 120, and to be projected on the secondary reflecting surface 123. The light is then reflected by the secondary reflecting surface 123 and enters the light guide 110. The light travels between the primarily reflecting surface 111 and the light exiting surface 112. At least a part of the light entering the light guide 110 is projected on the primarily reflecting surface 111 and is further reflected to the light exiting surface 112 by the primarily reflecting surface 111.

Referring to FIGS. 3, 4, and 5, a primarily reflecting layer 111a is disposed on the primarily reflecting surface 111 and a secondary reflecting layer 123a is disposed on the secondary reflecting surface 123, such that the primarily reflecting surface 111 and the secondary reflecting surface 123 are capable of reflecting light. The primarily reflecting layer 111a and the secondary reflecting layer 123a are reflective coating respectively coated on the primarily reflecting surface 111 and the secondary reflecting surface 123. For example, silver particle-containing or mercury-containing coating is coated on the primarily reflecting surface 111 and the secondary reflecting surface 123 to form the primarily reflecting layer 111a and the secondary reflecting layer 123a respectively. In another implement, the primarily reflecting layer 111a and the secondary reflecting layer 123a are metal plates made of metal having high reflection coefficient, for example, aluminum. In the case of low reflection coefficient requirement, the primarily reflecting layer 111a and the secondary reflecting layer 123a can be white coating (for example, titanium dioxide coating), or a plate with a white surface (for example, a plate coated with a white coating, or a plastic plate made of white plastic).

Referring to FIGS. 3, 4, and 5, the first lamp assembly 131 includes a first light source 131a and a first reflecting cover 131b. The first light source 131a projects light on the first light entering surface 121, such that the light passes through the first light entering surface 121, the protruding part 120, and the light entering interface 113 to be projected on the primarily reflecting surface 111 of the light guide 110. Therefore, the light is reflected by the primarily reflecting surface 111 to the light exiting surface 112. The first reflecting cover 131b covers the first light entering surface 121, and the first light source 131a is disposed in the first reflecting cover 131b. The light projected by the first light source 131a directly passes through the first light entering surface 121, or is reflected by the first reflecting cover 131b and then passes through the first light entering surface 121. The first light source 131a can be a cold cathode fluorescent lamp (CCFL) or a light emitting diode (LED) array disposed on a circuit board.

Referring to FIGS. 3, 4, and 5, the second lamp assembly 132 includes a second light source 132a and a second reflecting cover 132b. The second light source 132a projects light on the second light entering surface 122, such that the light enters the protruding part 120 and is reflected by the secondary reflecting surface 123. Therefore, the light is reflected by the secondary reflecting surface 123 to pass through the light input surface 123, and the light is projected on the primarily reflecting surface 111, and is then reflected to the light exiting surface 112 by the primarily reflecting surface 111. The second reflecting cover 132b covers the second light entering surface 122, and the second light source 132a is disposed in the second reflecting cover 132b. The light projected by the second light source 132a directly passes through the second light entering surface 122, or is reflected by the second reflecting cover 132b and then passes through the second light entering surface 122. The second light source 132a can be a CCFL, or an LED array disposed on a circuit board.

Referring to FIGS. 2 and 3, no matter the light sources is a CCFL or an LED array, luminance or hue of the emitted light is affected by high temperature. In order to decrease the temperature of the first lamp assembly 131 and the second lamp assembly 132, the edge-light backlight assembly 100 further includes a heat dissipating plate 140, which includes a plurality of bended sections 141. At least a part of the heat dissipating plate 140 contacts with the first reflecting cover 131b and the second reflecting cover 132b, and the rest part of the heat dissipating plate 140 extends out of the primarily reflecting surface 121 of the light guide 110. In first embodiment, at least two of the bended sections 141 contact with the first reflecting cover 131b and the second reflecting cover 132b. The heat dissipating plate 140 receives heat generated by the first light source 131a and the second light source 121b through thermal conduction, so as to cool the first light source 131a and the second light source 121b.

Referring to FIGS. 4 and 5, the light of the first light source 131a passing through the first light entering surface 121 is directly projected on the primarily reflecting surface 111. The light of the second light source 132a is projected on the secondary reflecting surface 123 at first, and is then reflected to the primarily reflecting surface 111. Therefore, the first light source 131a and the second light source 132a project light simultaneously to enhance the brightness of the edge-light backlight assembly 100.

The first lamp assembly 131 and the second lamp assembly 132 project light simultaneously to enhance the brightness of the edge-light backlight assembly 100. However, the first light source 131a and the second light source 132a are not disposed at a side of the light guide 110 in parallel, but are disposed at different positions respectively. The first light source 131a and the second light source 132a project light in different directions. Therefore, it is not required to increase the thickness of the light guide for the first light source 131a and second light source 132a to project light from the same lateral surface. Further, a large distance between the first light source 131a and the second light source 132a can be maintained to avoid heat concentrating into a small area to influence on the heat dissipation effect.

Figure 6:
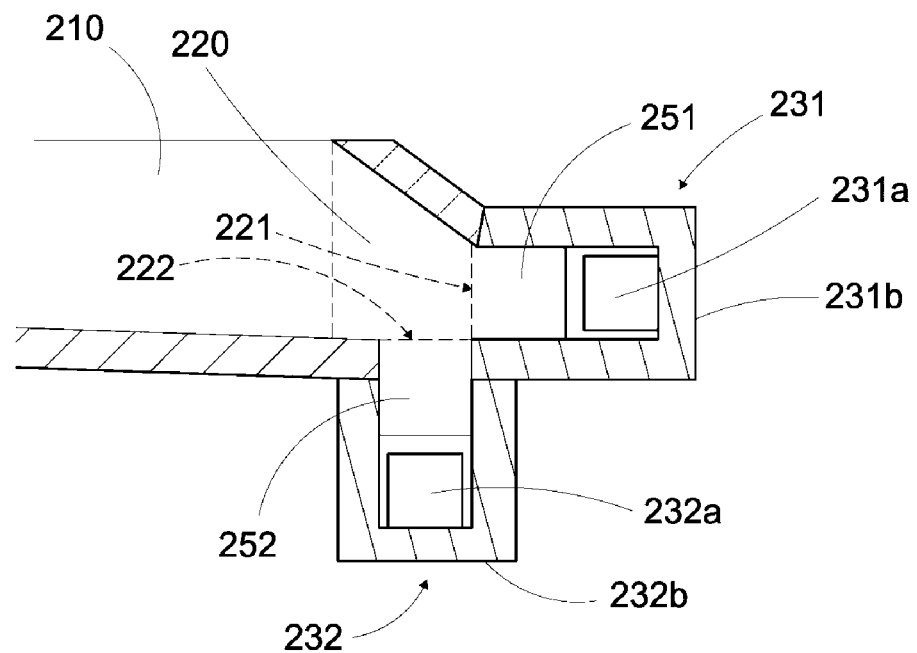
FIG. 6 is a partial cross-sectional view of an edge-light backlight assembly according to a second embodiment of the present invention.
Figure 7:
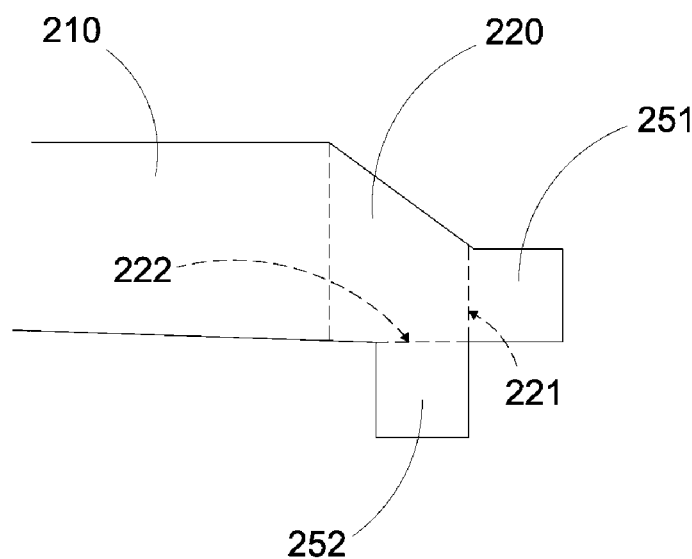
FIG. 7 is a partial cross-sectional view of a light guide according to a second embodiment of the present invention.

Referring to FIGS. 6 and 7, an edge-light backlight assembly according to a second embodiment of the present invention is shown, and the edge-light backlight assembly can be combined with an optical film and liquid crystal panel to form a LCD. The edge-light backlight assembly includes a light guide 210, a protruding part 220, a first lamp assembly 231, and a second lamp assembly 232. The second embodiment is approximately the same as the first embodiment, and the difference lies in that the edge-light backlight assembly of the second embodiment further includes a first light guide structure 251 and a second light guide structure 252. The first light guide structure 251 is made of a light-pervious material, and is disposed on the first light entering surface 221 to guide the light travel towards the first light entering surface 221. The first light guide structure 251 is formed on the first light entering surface 221 integrally, or is adhered to the first light entering surface 221 by a transparent glue. The first reflecting cover 231b covers the first light entering surface 221, such that the first light source 231a and the first light guide structure 251 are disposed in the first reflecting cover 232b. The light projected by the first light source 231a passes through the first light entering surface 221 through the first light guide structure 251.

The second light guide structure 252 is made of a light-pervious material, and is disposed on the second light entering surface 222 to guide the light travel towards the second light entering surface 222. The second light guide structure 252 is monolithically formed on the second light entering surface 222, or is adhered to the second light entering surface 222 by transparent glue. The second reflecting cover 232b covers the second light entering surface 222, such that the second light source 232a and the second light guide structure 252 are disposed in the second reflecting cover 232b. The light projected by the second light source 232a passes through the second light entering surface 222 through the second light guide structure 252.

Figure 8:
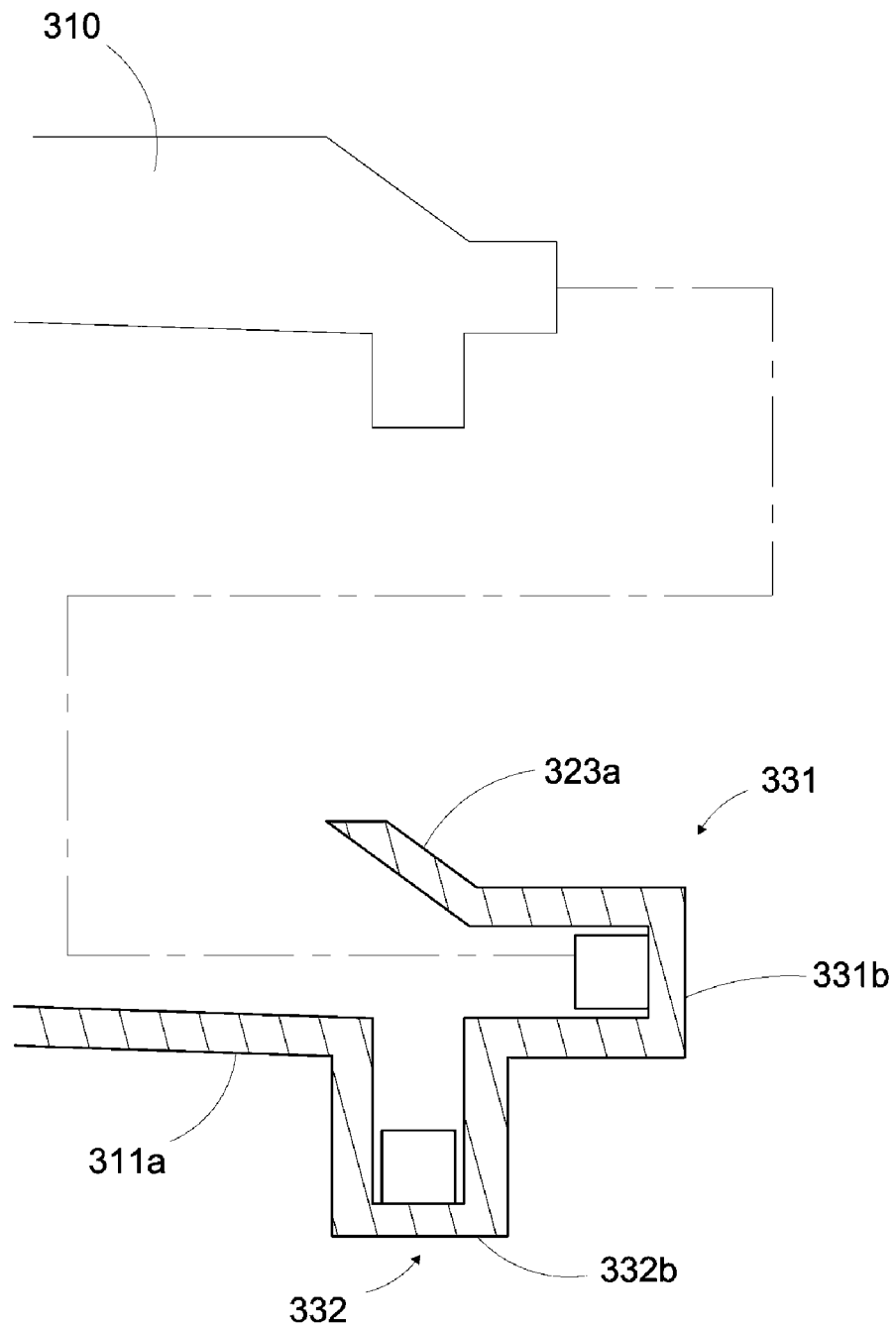
FIG. 8 is an exploded cross-sectional view of an edge-light backlight assembly according to a third embodiment of the present invention.

Referring to FIG. 8, an edge-light backlight assembly according to a third embodiment of the present invention is shown, and the edge-light backlight assembly can be combined with an optical film and a liquid crystal panel to form a LCD. The edge-light backlight assembly includes a light guide 310, a first lamp assembly 331, and a second lamp assembly 332. The third embodiment is approximately the same as the first embodiment or the second embodiment, and the difference lies in that a primarily reflecting layer 311$a$, a secondary reflecting layer 323$a$, a first reflecting cover 331$b$, and a second reflecting cover 332$b$ of the third embodiment are a monolithically formed structure. The monolithically formed structure can be a bended metal plate made of metal having high reflection coefficient, for example, aluminum. In the case of low reflection coefficient requirement, the structure can be a white bended plate, for example, a plate coated by a white coating, or a plastic plate made of white plastic.

Figure 9:
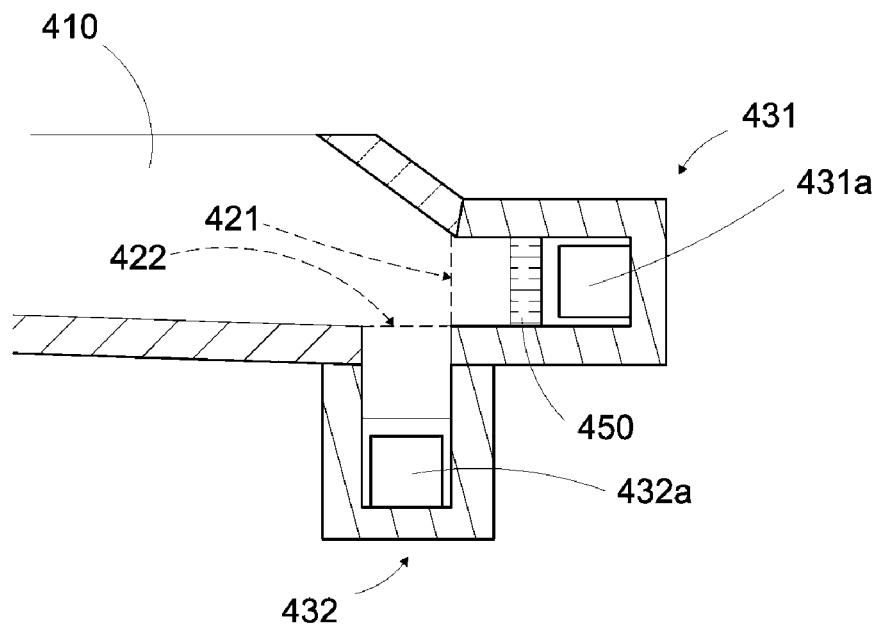
FIGS. 9 and 10 are partial cross-sectional views of an edge-light backlight assembly according to a fourth embodiment of the present invention.
Figure 10:
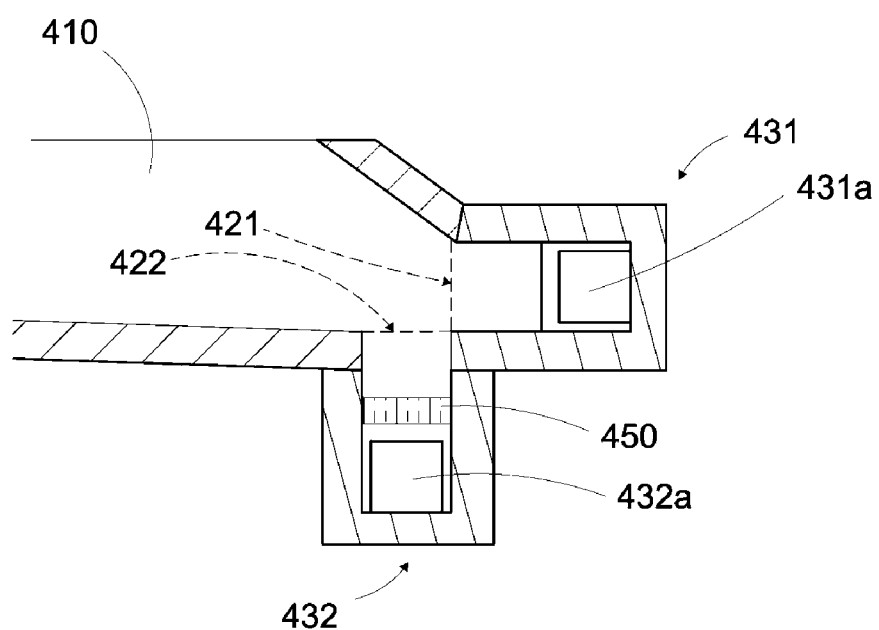

Referring to FIGS. 9 and 10, an edge-light backlight assembly according to a fourth embodiment of the present invention is shown, and the edge-light backlight assembly can be combined with an optical film and a liquid crystal panel to form a LCD. The edge-light backlight assembly includes a light guide 410, a first lamp assembly 431, and a second lamp assembly 432. The fourth embodiment is approximately the same as the first embodiment, the second embodiment, or the third embodiment. The difference lies in that the edge-light backlight assembly further includes a filter 450 disposed between the first light entering surface 421 and the first light source 431$a$, or the filter 450 is disposed between the second light entering surface 422 and the second light source 432$a$. The filter 450 is provided for filtering the light having a pre-determined wavelength.

When the LCD having the edge-light backlight assembly is used outside, and the user wares night vision imaging system (NVIS), the NVIS will generate high gain on the red light and infrared light emitted by the LCD. High gain on the red light is due to that the NVIS has relative high gain on light having a wavelength close to the wavelength of infrared light. When observing the LCD through the NVIS, the whole LCD picture presented in the NVIS has high brightness and lacks contrast, thus leading to the result that it is impossible to observe the LCD through the NVIS. Herein, the filter 450 can be a short pass filter (SPF), and merely allow the light having a wavelength lower than that of the infrared light to pass through. That is, merely one of the first light source 431$a$ and the second light source 432$a$ provides white light, and the other provides the infrared light or the light with red light filtered out, thus decreasing the overall intensity of the infrared light, and improving the contrast of the picture presented by the NVIS.

Figure 11:
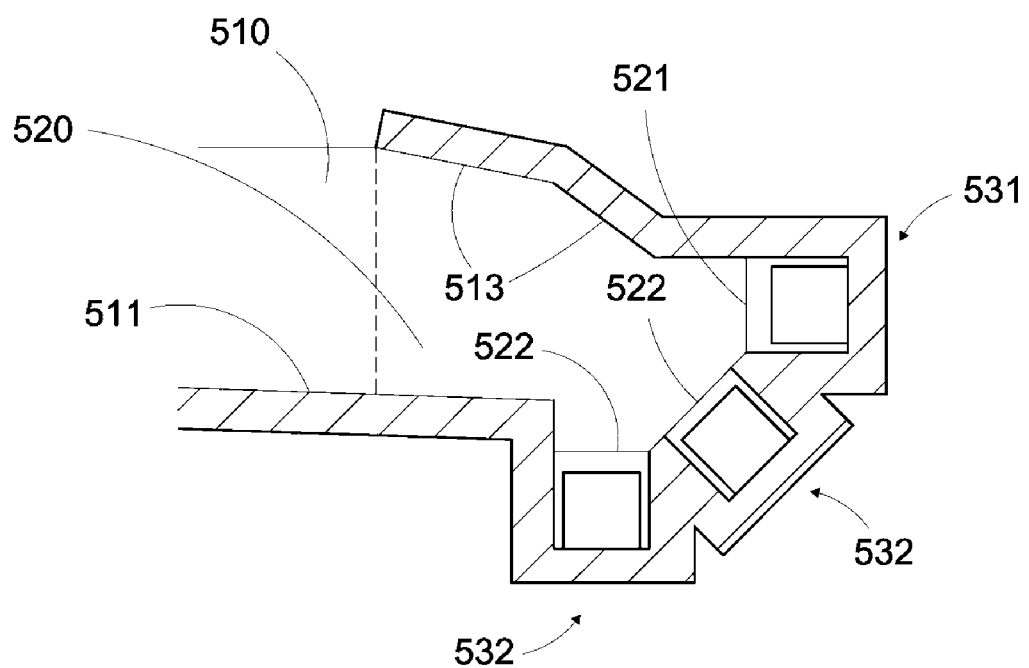
FIG. 11 is a partial cross-sectional view of an edge-light backlight assembly according to a fifth embodiment of the present invention.

Referring to FIG. 11, an edge-light backlight assembly according to a fifth embodiment of the present invention is shown, and the edge-light backlight assembly can be combined with an optical film and a liquid crystal panel to form a LCD. The edge-light backlight assembly includes a light guide 510, a first lamp assembly 531, and a plurality of second lamp assemblies 532.

In the fifth embodiment, a protruding part 520 includes a first light entering surface 521, a plurality of second light entering surfaces 522, and a plurality of secondary reflecting surfaces 513.

Each of the second light entering surfaces 522 is disposed corresponding to one secondary reflecting surface 513, such that the light entering the protruding part 520 through each second light entering surface 522 is projected to the corresponding secondary reflecting surface 513, and then is reflected to the primarily reflecting surface 511.

Each of the plurality of second lamp assemblies 532 is disposed corresponding to one second light entering surface 522, such that the emitted light enters the protruding part 520 through the corresponding second light entering surface 522, and then is reflected by the respective secondary reflecting surface 513 and is projected on the primarily reflecting surface 511. Through providing light by the plurality of second lamp assemblies 532 and the first lamp assembly 521 together, the brightness of the edge-light backlight assembly is significantly enhanced.

The present invention provides a plurality of light input surfaces through extending the protruding part, thus the lamp assemblies are disposed dispersedly, so as to avoid heat concentration and reduce the design difficulty of the heat dissipating module While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. An edge-light backlight assembly, comprising:
   a light guide, made of a light-pervious material, and comprising a primarily reflecting surface, a light exiting surface, and a light entering interface, wherein the light guide is arranged such that the primarily reflecting surface is disposed opposite the light exiting surface, and the light entering interface connects the primarily reflecting surface and the light exiting surface; and
   a protruding part, made of a light-pervious material, disposed on the light entering interface, and the protruding part comprising:
   a first light entering surface, disposed opposite the light entering interface, for receiving light to enter the protruding part, and the light entering the light guide through the light entering interface and being projected on the primarily reflecting surface;
   at least one secondary reflecting surface, located between the light exiting surface of the light guide and the first light entering surface, for reflecting the light such that the light enters the light guide through the light entering interface and is projected on the primarily reflecting surface; and
   at least one second light entering surface, located between the primarily reflecting surface of the light guide and the first light entering surface, and disposed opposite the secondary reflecting surface, for the light to pass through to enter the protruding part, so as to be projected on the secondary reflecting surface.

2. The edge-light backlight assembly as claimed in claim 1, wherein an included angle is defined between the primarily reflecting surface and the light exiting surface.

3. The edge-light backlight assembly as claimed in claim 1, wherein the protruding part is monolithically formed on the light entering interface.

4. The edge-light backlight assembly as claimed in claim 1, wherein the protruding part is adhered to the light entering interface.

5. The edge-light backlight assembly as claimed in claim 1, wherein a primarily reflecting layer is disposed on the primarily reflecting surface and a secondary reflecting layer is disposed on the secondary reflecting surface, such that the primarily reflecting surface and the secondary reflecting surface are capable of reflecting light.

6. The light guide as claimed in claim 5, wherein the primarily reflecting layer is selected from the group consisting of reflective coating, white coating, metal plate, and plate with white surface.

7. The light guide as claimed in claim 5, wherein the secondary reflecting layer is selected from the group consisting of reflective coating, white coating, metal plate, and plate with white surface.

8. The light guide as claimed in claim 1, wherein the protruding part includes a plurality of second light entering surfaces and a plurality of secondary reflecting surfaces, and each of the second light entering surfaces faces one of the secondary reflecting surfaces.

9. The edge-light backlight assembly as claimed in claim 1, further comprising:
 a first light source, for projecting light on the first light entering surface, such that the light passes through the first light entering surface, the protruding part, and the light entering interface to be projected on the primarily reflecting surface of the light guide and reflected by the primarily reflecting surface to the light exiting surface; and
 a second light source, for projecting light on the second light entering surface, such that the light enters the protruding part to be reflected by the secondary reflecting surface, and the light reflected by the secondary reflecting surface passes through the light input surface and is projected on the primarily reflecting surface and then is reflected by the primarily reflecting surface to the light exiting surface.

10. The edge-light backlight assembly as claimed in claim 9, further comprising:
 a first reflecting cover, covering the first light entering surface, and the first light source disposed in the first reflecting cover; and
 a second reflecting cover, covering the second light entering surface, and the second light source disposed in the second reflecting cover.

11. The edge-light backlight assembly as claimed in claim 10, further comprising a heat dissipating plate, at least part of the heat dissipating plate contacting with the first reflecting cover and the second reflecting cover, and the rest part of the heating dissipating plate extending out of the primarily reflecting surface of the light guide.

12. The edge-light backlight assembly as claimed in claim 10, wherein the primarily reflecting layer, the secondary reflecting layer, the first reflecting cover, and the second reflecting cover are formed monolithically.

13. The edge-light backlight assembly as claimed in claim 9, further comprising:
 a first light guide structure, made of a light-pervious material, disposed on the first light entering surface, and the light projected by the first light source passing through the first light entering surface through the first light guide structure; and
 a second light guide structure, made of a light-pervious material, disposed on the second light entering surface, and the light projected by the second light source passing through the second light entering surface through the second light guide structure.

14. The edge-light backlight assembly as claimed in claim 13, wherein the first light guide structure is monolithically formed on the first light entering surface, and the second light guide structure is monolithically formed on the second light entering surface integrally.

15. The edge-light backlight assembly as claimed in claim 13, wherein the first light guide structure is adhered on the first light entering surface, and the second light guide structure is adhered on the second light entering surface.

16. The edge-light backlight assembly as claimed in claim 9, further comprising a filter, disposed between the first light entering surface and the first light source, for filtering light with a pre-determined wavelength.

17. The edge-light backlight assembly as claimed in claim 9, further comprising a filter, disposed between the second light entering surface and the second light source, for filtering light with a pre-determined wavelength.

* * * * *